Jan. 27, 1970  M. P. ROUBIN ET AL  3,492,100
PROCESS FOR OBTAINING SIMPLE AND MIXED CARBONITRIDES AND
OXYCARBONITRIDES OF TRANSITION METALS AND NEW
METALLIC CARBONITRIDES AND OXYCARBONITRIDES
CONTAINING SUCH METALS
Filed Nov. 24, 1967  4 Sheets-Sheet 1
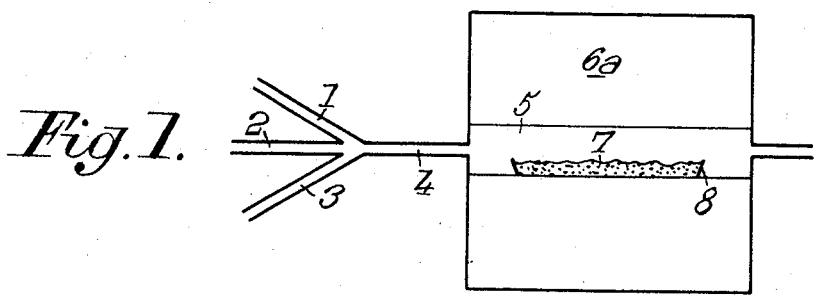
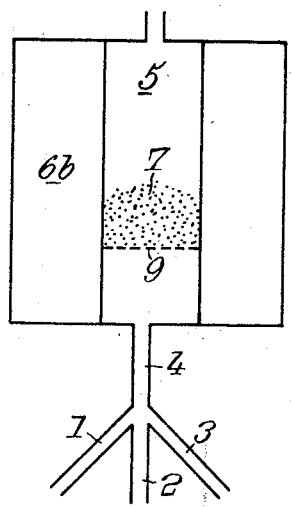
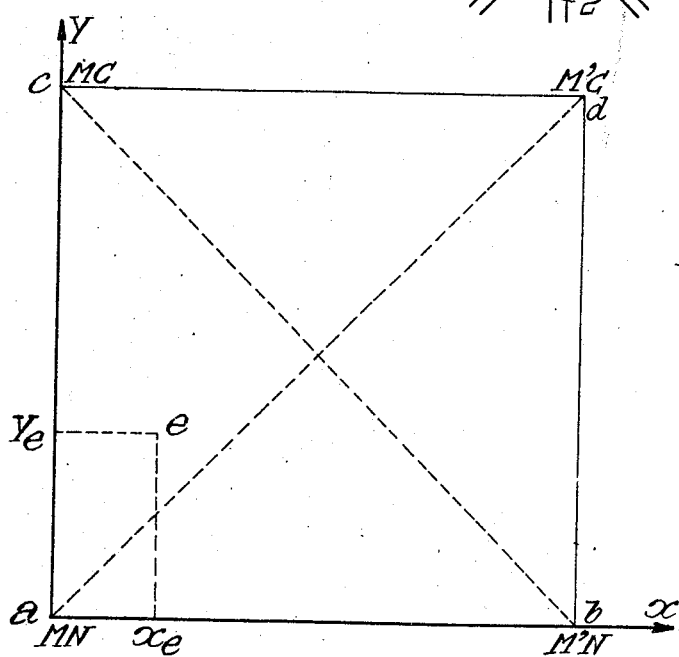
INVENTOR
M. P ROUBIN ET AL
BY
ATTORNEY

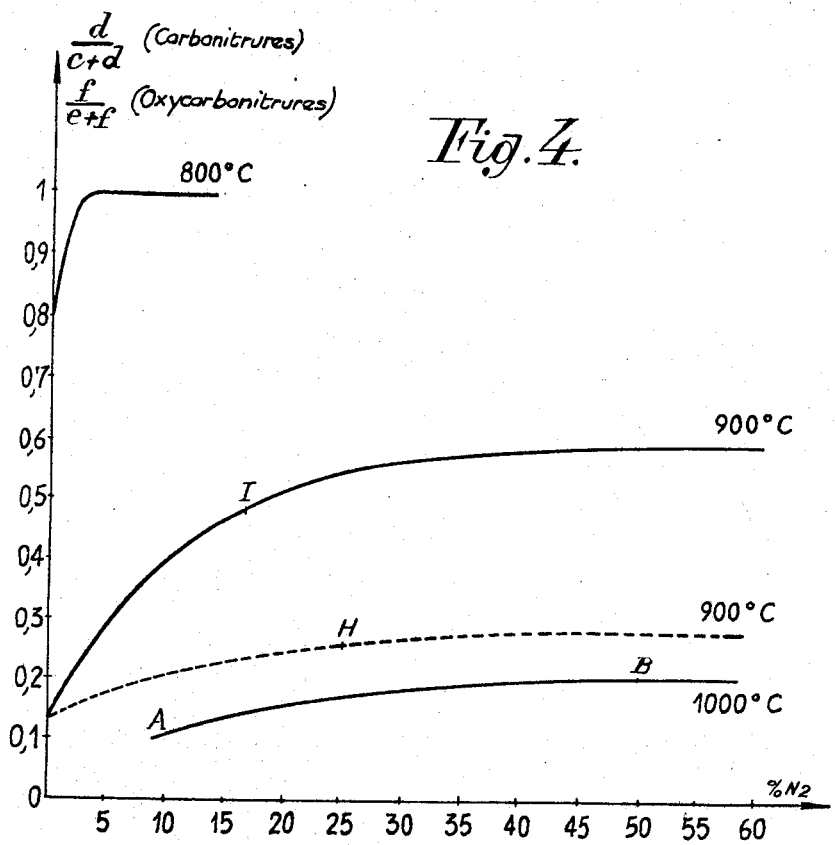
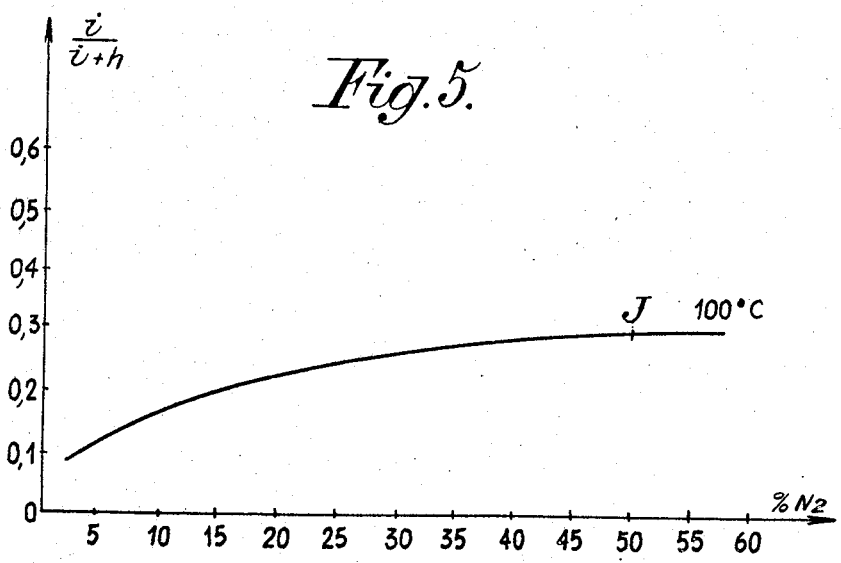

INVENTOR
M.P. ROUBIN ET AL
BY
ATTORNEY 3,492,100
PROCESS FOR OBTAINING SIMPLE AND MIXED CARBONITRIDES AND OXYCARBONITRIDES OF TRANSITION METALS AND NEW METALLIC CARBONITRIDES AND OXYCARBONITRIDES CONTAINING SUCH METALS
Marc Pierre Roubin, Jacques Maurice Paris, and René Antoine Paris, Lyon, France, assignors to Centre National de la Recherche Scientifique, Paris, France
Filed Nov. 24, 1967, Ser. No. 685,704
Claims priority, application France, Nov. 25, 1966, 85,031; July 13, 1967, 114,385
Int. Cl. C01g 33/00, 35/00
U.S. Cl. 23—315                              9 Claims

ABSTRACT OF THE DISCLOSURE

A process for preparing simple or mixed carbonitrides or oxycarbonitrides containing those of the transition metals from Groups IVa, Va and VIa of the Periodic Table that form simple or mixed nitrides or oxynitrides capable of losing nitrogen when they are heated to a temperature higher than 800° C., which comprises heating these nitrides or oxynitrides to a temperature ranging from about 800° C. to about 1000° C. in an atmosphere containing (a) a nitrogen containing gas, (b) a hydrocarbon, and (c) hydrogen in an amount sufficient to prevent cracking of said hydrocarbon at said temperature.

---

The present invention relates to a process for obtaining simple or mixed carbonitrides and oxycarbonitrides containing transition metals of Groups IVa to VIa of the Periodic Table; the invention is also concerned with new metal carbonitrides or oxycarbonitrides.

The above mentioned products contain in their composition at least one transition metal, carbon and nitrogen in the case of carbonitrides, with, in addition, oxygen in the case of oxycarbonitrides.

A certain number of processes for preparing certain carbonitrides are already known.

One of these processes consists in bringing an intimate mixture (generally compressed) of a carbide MC and a nitride MN where M represents a transition metal such as Ti, V, Nb to obtain simple carbonitrides of these metals, or an intimate mixture of a carbide MC and a nitride M'N (M and M' representing transition metals such as Ti, Zr, V, Nb or Ta), to obtain mixed carbonitrides of these metals, to temperatures in the range 2000° C. to 2600° C. in an inert atmosphere for a duration varying from two to four hours.

However, this reaction is difficult because of the low reactivity of the two refractory solids. The purity of the products obtained is often mediocre because of their possible contamination by the refractory container or the atmosphere, which are difficult to maintain inert at this high temperature. Finally, this process is not applicable to those nitrides which are instable at such a high temperature.

Concerning the preparation of simple carbonitrides, the following processes have also been proposed:

According to a second process, carbon is made to act on a metal nitride, in suitable proportions, at temperatures in the range 1000° C. to 2500° C. according to the reaction:

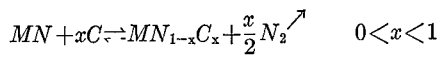

However, equilibrium is rarely reached since the reaction between such phases is conditioned by the phenomenon of diffusion of carbon into the nitride, and moreover, the carbonitride obtained contains a certain quantity of free carbon and of nitride which have not reacted.

According to a third process, either a lower carbide of general formula $MC_y$ (with $y<1$), or a mixture of a higher carbide MC with a metal M, is heated in a nitrogen atmosphere to temperatures in the range 1250° C. to 1300° C.

This process, which is carried out at a relatively low temperature (1200 to 1300° C.), nevertheless implies the preliminary manufacture, either of a lower carbide by heating between 1500° C. and 2000° C. of an intimate mixture of suitable proportions of carbon and a metal, or of the pure metal. In the first case, the above mentioned difficulties relating to obtaining pure, non-contaminated products at high temperature recur. In the second case, the difficulties inherent in the production of transition metals increases considerably the cost price of the carbonitrides obtained from such metals.

According to a fourth process, a gaseous mixture constituted by ammonia and a hydrocarbon is reacted with a transition metal, at temperatures in the range 1000° to 1200° C. In this manner, molybdenum carbonitrides of composition $Mo_2(C_{1-x}N_x)$ corresponding to the structure of the carbide $Mo_2C$ have been prepared. This process would nevertheless be very costly, particularly in the case in which it is applied to metals of the Group Va, for the same reasons as mentioned above.

An object of the present invention is to provide a new process for preparing metal carbonitrides or oxycarbonitrides which fulfills the considerations of practice better than the known processes, in particular with respect to the lowering of the cost price, the control of the final composition of the compound obtained and their ability to provide new compounds of carbonitridation.

The present invention comprises principally a process of preparing simple or mixed carbonitrides and oxycarbonitrides containing transition metals belonging to Groups IVa to VIa of the Periodic Table that form simple and mixed nitrides or oxynitrides capable of losing nitrogen when they are heated to a temperature higher than 800° C., which process comprises heating these nitrides or oxynitrides to a temperature in the range from about 800° C. to about 1000° C. in an atmosphere containing (a) nitrogen or a gas, such as ammonia, capable of liberating nitrogen, (b) a hydrocarbon, such as methane, (c) and hydrogen in a quantity sufficient to prevent the cracking of the hydrocarbon at said temperature.

The process according to the invention is particularly advantageous for the preparation, among others, of simple carbonitrides and oxycarbonitrides of transition metals of the Group Va of the Periodic Table, because of the particular aptitude of nitrides and oxynitrides of these elements, particularly of vanadium, niobium and tantalum, for losing nitrogen in the above mentioned temperature interval, the relative thermal instability of these compounds increasing with temperature.

It has been observed, when the process according to the present invention is carried out (which process has besides revealed itself all the more advantageous as the direct carbonitridation of the corresponding oxides under the same conditions is more difficult to control) that the process provides a controlled and perfectly reproducible substitution of a part of the nitrogen of these nitrides or oxynitrides, when the parameters of the reaction, such as the temperature, the composition of the treatment atmosphere, the initial composition of these nitrides or oxynitrides are adjusted to determined values and when the reaction products are maintained under that temperature in that atmosphere until the stabilization of the formula of the carbonitride or the oxycarbonitride obtained.

However, this progressive and controlled substitution of the nitrogen by the carbon cannot be envisaged directly, in the temperature domain envisaged, for nitrides of the metals of Group IVa or the metals of Group VIa of the Periodic Table, because the nitrogen is held too strongly in the first case or too weakly in the second case by the crystalline structure of these refractory phases.

Nevertheless, it is possible to prepare mixed carbonitrides or oxycarbonitrides containing elements IVa or VIa of the Periodic Table, in particular titanium or chrominum, by applying the process according to the invention in the case in which the element in question belongs to Group IVa, to a mixed nitride or oxynitride of this element and an auxiliary element taken from the higher Groups Va or VIa;

in the case in which the element in question belongs to the Group VIa, to a mixed nitride or oxynitride of this element and an auxiliary element taken from the lower Groups Va and IVa;

insofar as the crystalline structures of the nitrides or oxynitrides of all these elements are sufficiently compatible with each other to be able to form solid solutions with each other.

It has been noticed that the stability of a nitride (or oxynitride) of an element of Group IVa, such as titanium, can be lowered if part of the atoms of this element in the nitride are replaced by atoms of an element of Group Va, or even of Group VIa. Reciprocally, the stability of a nitride (or oxynitride) of an element of Group VIa, such as chromium, can be increased if part of the atoms of this element are replaced by atoms of an element of Group Va, or even of Group IVa. The nitrides or oxynitrides thus modified then form solid solutions of nitrides or oxynitrides of at least two elements.

The process according to the present invention permits, not only the preparation of a large variety of carbonitrides of the above mentioned elements known in themselves, but also the preparation of new compounds, such as niobium oxycarbonitrides containing less than 5% by weight of oxygen in their composition, homogeneous carbonitrides based on chromium and one of the metals of the group formed by Ti and V, oxycarbonitrides of metals of the group formed by Ti, V and Nb containing less than 5% oxygen in their composition. More particularly it is possible to regulate the final desired composition of these carbonitrides or oxycarbonitrides as a function of various parameters, in particular as a function of the composition of the starting nitrides or oxynitrides, of the temperature and of the constitution of the carbonitridation atmosphere.

It has been noticed that the variation of each of these parameters in carrying out the process according to the invention, the others being supposed to be maintained constant, also causes a variation of the final composition of the carbonitride or oxycarbonitride obtained.

In particular, the ratio of the nitrogen content to the carbon content in the final product varies inversely as the temperature, when the other parameters are maintained constant. In other words, products which are rich in nitrogen will be obtained by carrying out the process at a temperature in the neighbourhood of 800° C., and which are rich in carbon by carrying out the process at a temperature in the neighbourhood of 1000° C.

By contrast, in the case in which the treatment temperature and the initial composition of the starting nitrides or oxynitrides are fixed, an increase of the proportion of nitrogen in the gaseous treatment mixture, or more generally of the vapour pressure of the nitrogen in this mixture, causes an increase of the nitrogen content of the final metal oxycarbonitride or carbonitride. The presence of gaseous nitrogen in the treatment mixture assures a control of the proportion of nitrogen substituted by carbon in the treated product.

Although nitrogen is the most favourable gas for carrying out the treatment, it can also be replaced by gaseous ammonia. However, in the case of this latter gas, it is more difficult to determine with certainty the vapour pressure of nitrogen in the gaseous treatment mixture.

The carbidation of the nitrided compound is naturally due to the presence, in the reaction atmosphere, of a hydrocarbon. It is important to avoid cracking of the hydrocarbon which would then lead to a deposit of carbon soiling the product obtained. Under these conditions, methane, whose molecule is relatively stable, is preferable to other, more condensed hydrocarbons. Finally, it is appropriate to dilute strongly the methane by hydrogen in order to shift the following dissociation equilibrium backwards:

$$CH_4 \rightleftharpoons C + 2H_2$$

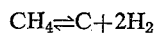

For this purpose, the gaseous mixture should not contain more than 4.5% (by volume) of methane with respect to hydrogen if the process is carried out at 800° C., nor more than 1% (by volume) of methane with respect to hydrogen if the process is carried out at 1000° C.

The result of the foregoing is that when all the reaction parameters are fixed, and when the starting nitride or oxynitride is maintained long enough in the gaseous carbonitridation current at the determined temperature of the treatment, a carbonitride or oxycarbonitride is obtained of the corresponding metal whose composition is perfectly reproducible under the same conditions of treatment. In practice, the duration of the carbonitridation treatment can be fixed in advance if a sufficient margin is provided guarantying a complete reaction in the given work conditions, this duration being fixed for example at about 15 hours. According to the conditions of the treatment, the starting compounds are liable to lose, to preserve or even to gain large proportions of nitrogen and of carbon. If the treatment is carried out on oxynitrides, the complete elimination of oxygen from the crystalline structure leads to a carbonitride; on the other hand the incomplete elimination of this oxygen leads to an oxycarbonitride.

Needless to say, the operator can check at any time the stage of the reaction by chemical analysis. Indeed, such an analysis of the residue bearing on the metal, the carbon and the nitrogen can be easily carried out; this analysis permits a composition to be attributed to the product obtained. In general, if a carbonitride is completely formed, the addition of ponderal percentages leads to a sum comprised between 99 and 100%. In the case in which this sum is lower than 99%, one is then dealing with an oxycarbonitride. This chemical examination is advantageously completed by a radiocrystallographic examination permitting the phase present in the residue to be identified.

It should be noted, more particularly in the case of the preparation of mixed carbonitrides or oxycarbonitrides containing elements of Group IVa, such as titanium, or of Group VIa such as chromium, that the degree of thermal instability (reduced in the case of titanium and increased in the case of chromium) of the starting nitrides or oxynitrides in the temperature interval 800 to 1000° C. becomes preponderant.

In particular, for example, the more titanium that the mixed starting nitride or oxynitride contains, the more stable this nitride or oxynitride will be. This mixed phase thus has a tendency to fix as much less carbon as it contains more titanium, when it is subjected to the treatment according to the invention, for fixed values of the other parameters of the reaction.

Reciprocally, still for example, the more chromium that the mixed starting nitride or oxynitride contains, the less stable this nitride or oxynitride will be. This mixed phase thus has a tendency to fix as much more carbon as it contains more chromium, when it is subjected to the treatment according to the invention, for fixed values of the other reaction parameters.

Starting from mixed nitrides and oxynitrides of determined initial composition, naturally, there also, mixed carbonitrides or oxycarbonitrides can be obtained whose respective carbon and nitrogen contents can be predetermined as a function of the other parameters of the process according to the invention.

The invention will be easily understood from the following specific description, given merely by way of example, with reference to the accompanying drawings in which:

FIGURES 1 and 2 show schematically two embodiments of a device which can be used for carrying out the process according to the invention;

FIGURES 3, 4 and 5 represent graphs permitting the experimental conditions (temperature, composition of the gaseous mixture) to be determined for obtaining a simple metal carbonitride or oxycarbonitride of given composition from the corresponding nitrides and oxynitrides;

FIGURE 6 is a square diagram for graphically representing mixed carbonitrides or oxycarbonitrides;

Figure 3:
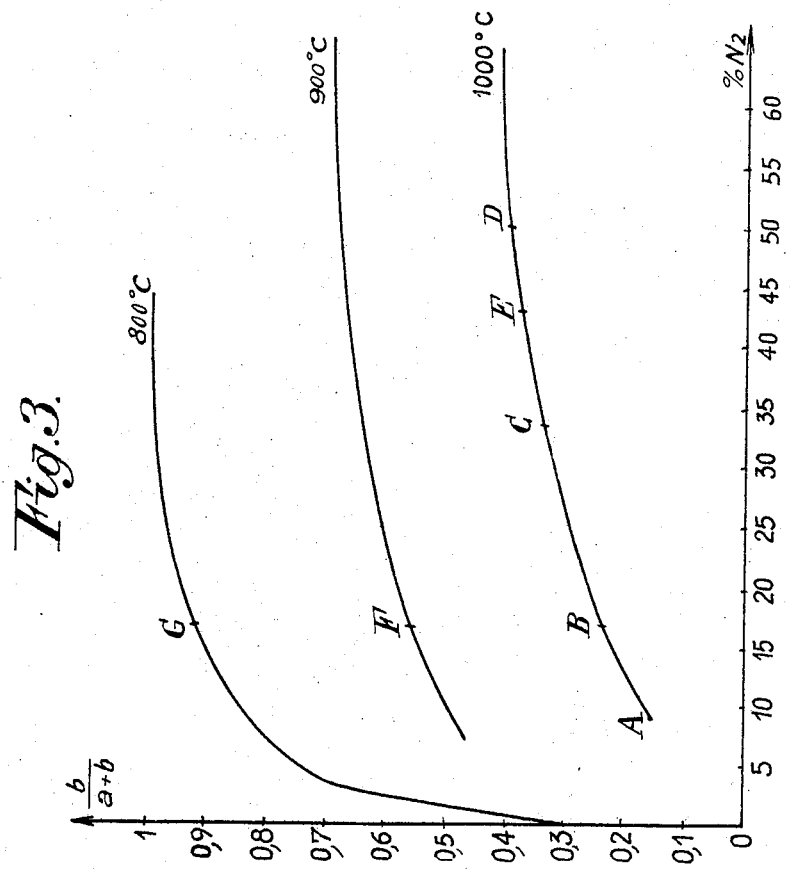

The process according to this invention can advantageously be carried out in apparatuses using the principles of the apparatuses represented in FIGURE 1 (fixed bed principle) or in FIGURE 2 (fluid bed principle).

In both cases, the hydrogen, methane and nitrogen or ammonia arrive respectively through the conduits 1, 2 and 3 leading into a single conduit 4 which brings the gaseous mixture into an enclosure 5 which is heated by heating elements 6a and 6b.

In the case of FIGURE 1, the enclosure 5 is disposed horizontally and the product 7 is spread out in a thin layer in a container 8 inside this enclosure.

In the case of FIGURE 2, the enclosure 5 is disposed vertically, the product 7 forming, according to the technique chosen, a fixed layer or a fluid bed above the grill 9. These latter two variations permit larger quantities of the products to be treated in shorter reaction times, since they permit a better contact between the reagents.

The metal nitrides or oxynitrides subjected to the treatment according to the invention can advantageously be constituted, in particular with regard to simple nitrides or oxynitrides by:

Vanadium nitride=VN
Niobium nitride=NbN
Tantalum oxynitride=TaON and the oxynitrides of general formula $$MN_mO_n$$

with M=V or Nb with in the case of $$V \begin{cases} 0.9 < m < 1 \\ 0.05 < n < 0.1 \end{cases}$$

and in the case of $$Nb \begin{cases} 1 < m < 1.2 \\ 0.1 < n < 0.3 \end{cases}$$

and with regard to mixed nitrides and oxynitrides by the mixed nitrides:

$$Cr_xV_{1-x}N \quad 0 < x < 1$$

$$Cr_xTi_{1-x}N \quad 0 < x < 1$$

and the oxynitrides of general formula:

$$Ti_xV_{1-x}N_mO_n$$

with $0.8 < m < 0.95 \quad 0.1 < n < 0.25$ with $$Ti_xNb_{1-x}N_pO_q \quad 1 < p < 1.05 \quad 0.1 < q < 0.2$$

and $$0 < x < 1$$

These initial phases can be prepared in a manner known in itself, for example as decribed in the following publications.

(1) For the nitrides or oxynitrides (in particular of V, Nb, Ta): Roubin, Doctoral Thesis (Thèse de 3ème Cycle), Lyon (1965); H. Funk and H. Böhland, Z. Anorg. Allgem. Chem., 334, 155–62 (1964); G. Brauer and J. R. Weidlein, Angew. Chem., 77, 913 (1965).

(2) For the mixed nitrides or oxynitrides (in particular Ti, V, Nb, Cr): M. P. Roubin, J. M. Paris and R. A. Paris, French Patent No. 1,429,307 (1964); H. Bittner, H. Goretzki, F. Benesovsky and H. Nowotny, Monatsch. Chem., 1963, 94, 518–26; P. Duwez and F. Odell, J. Electrochem. Soc., 1950, 97, 299–304.

The starting compounds can generally be obtained by the action of ammonia or nitrogen, should the need arise, mixed with hydrogen at a temperature comprised between 700° C. and 1000° C. on a hydrated or calcined oxide, and organic or mineral salt of the transition metal, to obtain a simple oxynitride; on a coprecipitate of hydrated oxides or on mixed or intimately associated complexes obtained by syncrystallization or simultaneous crystallization of solutions containing two metal complexes, to obtain a mixed nitride or oxynitride.

The compositions of the products obtained by carrying out the process according to the invention, which are variable as a function of the various parameters characterizing this process, naturally depend on the ability (known in itself) of nitrides and carbides to form solid solutions. This ability is to a large extent a function of the crystalline systems of the pure carbides and nitrides of the elements considered, both in the case of simple carbonitrides and oxycarbonitrides, notably of elements of Group V$a$ of the Periodic Table, and in the case of mixed carbonitrides and oxycarbonitrides, containing in particular elements of Group IV$a$ or VI$a$, which will be examined successively later on.

(I) Simple carbonitrides and oxycarbonitrides, in particular of elements of Group V$a$: These solid solutions can be represented by the general formula $MC_aN_b$, in which M represents the metal of Group V$a$ and the quantity $a+b$ represents the proportion of the non-metal elements (carbon+nitrogen) in the carbonitride. The composition of such a nitride can again be defined by the ratio $$\frac{b}{a+b} \quad \frac{N}{C+N}$$

This ratio will vary from 0 (the case of pure carbide) up to 1 (the case of pure nitride) according to the representation of the carbonitrides which has been advocated by G. Brauer and W. D. Schnell (J. Less. Comm. Metals, 7 (1964), 23–30).

All the carbides of transition elements of the Group V$a$ of the Periodic Table crystallize in the face centred cubic system of the sodium chloride type.

The nitride of vanadium VN has an analogous crystalline structure; the nitride of niobium NbN and of tantalum TaN belong, by contrast, to a system of hexagonal symmetry.

When the metal carbide and nitride are isomorphic (the case of vanadium) there is total miscibility between these two refractory phases. In other words, a complete series of carbonitrides exists for the entire range of compositions between the carbide and the nitride. On the other hand, if a difference of crystalline structure exists between the two extreme phases, the miscibility is only partial. Thus tantalum carbide TaC can dissolve only 40% (by moles) of hexagonal nitride TaN. Only the tantalum carbonitrides which are rich in carbon can be prepared, and these crystallize in the cubic system of the sodium chloride type.

As for niobium carbide NbC, it can dissolve only 30% (by moles) of hexagonal nitride NbN. The niobium carbonitrides are thus limited to the compositions which are rich in carbon.

The vanadium carbonitrides that result from the syncrystallization of the carbide $VC_{0.9}$ (the limit of the compositions of the domain of homogeneity of the phase "VC") and of the nitride $VN_{1.00}$ can thus be represented by the general formula:

$VC_aN_b$ with practically $0.9 < a+b < 1$ $$0.1 < \frac{b}{a+b} < 0.95 \qquad \text{(I)}$$

Similarly, the general formulas of the carbonitrides of niobium and of tantalum can be represented respectively by the following formulas:

$NbC_cN_d$ with $c+d$ very near to 1

$$0.1 < \frac{d}{c+d} < 0.28 \qquad \text{(II)}$$

$TaC_hN_i$ with $h+i$ very near to 1

$$0.15 < \frac{i}{h+i} < 0.30 \qquad \text{(III)}$$

The process according to the invention has permitted the preparation, starting from niobium oxynitrides, of a series of completely new solid solutions constituted by niobium oxycarbonitrides which can be designated by the general formula:

$NbC_eN_fO_g$ with practically $e+f$ very near to 1

$$0.13 < \frac{f}{e+f} < 0.90$$

$$g \ll 0.1 \qquad \text{(IV)}$$

Niobium nitride, which, as mentioned above, normally belongs to the crystalline system having hexagonal symmetry, can crystallize in the face centred cubic system of the sodium chloride type if it contains at least 1% (by weight) of oxygen in its crystalline structure. Such a possibility does not seem to present itself in the case of tantalum. It results from the isomorphism of niobium oxynitride and of niobium carbide NbC that these two compounds are miscible in all proportions.

The general formulas of the various carbonitrides and oxycarbonitrides which have been indicated above correspond to the compositions which can be practically and conveniently explored. In particular, it is difficult (although not impossible) to make precise quantity determinations of carbon and nitrogen in the carbonitrides or oxycarbonitrides which are very poor in carbon, in particular in the case in which the proportion of nitrogen with respect to the totality of the carbon and the nitrogen contained in the carbonitride (or the oxycarbonitride) becomes lower than the minimum values 0.1, 0.1, 0.15 and 0.13 respectively of this ratio envisaged in the general Formulas I, II, III and IV.

In order to obtain carbonitrides (or oxycarbonitrides) which are very poor in carbon, it is necessary to work at the lowest temperatures with gases which are very poor in hydrocarbon, in particular in methane.

In the case of niobium oxycarbonitrides, the ratio $$\frac{f}{e+f}$$

practically does not exceed the upper practical limit (0.90) indicated. In order to obtain oxycarbonitrides which are still richer in carbon, it is necessary to further enrich the gaseous mixture in hydrocarbon and to increase the treatment temperature which has for its effect to eliminate completely the oxygen from the oxycarbonitride, thus resulting in a simple carbonitride of niobium.

In order to illustrate further the invention (needless to say without limiting the invention in any way), the graphs of FIGURES 3, 4 and 5 will now be referred to. These graphs show the effects of adjusting the various parameters of the process according to the invention in order to obtain, from a nitride or an oxynitride of one of the metals envisaged above, carbonitrides (or oxycarbonitrides) of variable compositions.

The graph of FIGURE 3 shows the variations of the final composition of the carbonitride of vanadium obtained from the oxynitride of vanadium $VN_{0.96}O_{0.05}$ (which can be prepared in a manner known in itself, for example, as described in Example I given hereafter) as a function of the nitrogen content in the gaseous mixture of carbonitridation. The treatment temperatures are fixed respectively at 800° C. (isotherm 800° C.), 900° C. (isotherm 900° C.) and 1000° C. (isotherm 1000° C.).

The abscissa represents the variations of the nitrogen content of the gaseous mixture of carbonitridation expressed in volumetric percentage (percent $N_2$), and the ordinate represents the variations resulting from the proportions of nitrogen and of carbon in the carbonitride obtained, expressed by the ratio $$\frac{b}{a+b}$$

defined above.

Suppose, for example, that a carbonitride of vanadium is to be prepared with a gaseous mixture of carbonitridation containing 9% nitrogen (flow of 2 l./h.) at a temperature of 1000° C. The gaseous current is regulated accordingly, and the temperature of the sample of the oxynitride $VN_{0.96}O_{0.05}$ is raised at the rate of 250°/h. until the temperature of 1000° C. is reached, and the treated sample is maintained at this temperature in the above mentioned gaseous current for 20 hours.

The X-ray diffraction spectrum of the final product characterizes a single well crystallized phase in the cubic system, and analysis shows that it is the carbonitride of vanadium which can be defined by the formula $VN_{0.15}C_{0.86}$ (point A on the isotherm 1000° C.).

By increasing the proportions of nitrogen in the gaseous mixture to values respectively 16.6%, 33% and 50%, and by carrying out the process under otherwise identical operating conditions, the carbonitrides are obtained whose compositions are represented by the points B, C and D respectively of the isotherm 1000° C. The ratio $$\frac{b}{a+b}$$

in the carbonitrides $VC_aN_b$ thus varies from 0.15 to 0.40. The results which have just been described are summarized in Table I give below:

TABLE I

| Point on the isotherm | Flow $H_2$, l./h. | Flow $CH_4$, l./h. | Flow $N_2$, l./h. | Percent $N_2$ (by vol.) | Formula of the carbonitride | Value of the ratio $\frac{b}{a+b}$ |
|---|---|---|---|---|---|---|
| A | 20 | 0.2 | 2 | 9 | $VN_{0.15}C_{0.86}$ | 0.15 |
| B | 20 | 0.2 | 4 | 16.6 | $VN_{0.24}C_{0.76}$ | 0.24 |
| C | 20 | 0.2 | 10 | 33.3 | $VN_{0.34}C_{0.67}$ | 0.33 |
| D | 20 | 0.2 | 20 | 50 | $VN_{0.41}C_{0.60}$ | 0.40 |

The isotherms 800° C. and 900° C. show the corresponding variations of the compositions of the carbonitrides obtained from the same oxynitride $VN_{0.96}O_{0.05}$ in identical conditions, with the exception of the final temperatures of the treatment which have been fixed respectively at 800° C. and 900° C.

It results from the foregoing that these isotherms permit the easy choice of the most favourable operating conditions for obtaining a carbonitride of given composition. Furthermore, experience has shown that the composition of the starting product (nitride or oxynitride of vanadium) has practically no influence on the composition of the carbonitride obtained under given conditions of temperature and of the composition of the gaseous mixture of carbidation. Naturally it is easy to trace, under analogous conditions, the intermediate isotherms, for example 850° C. or 950° C. if it is wished to work at these temperatures.

The graph of FIGURE 4 shows the variation of the composition with respect to carbon and nitrogen of the niobium carbonitrides or oxycarbonitrides obtained under various treatment temperatures as a function of the composition with respect to nitrogen of the gaseous mixture of carbonitridation under the same experimental conditions as in the case of FIGURE 3, either starting from the niobium oxynitride $Nb_{0.73}N_{0.76}O_{0.23}$ (solid line isotherms 800° C., 900° C., 1000° C. corresponding respectively to final treatment temperatures of 800, 900 and 1000° C.); or starting from niobium nitride NbN (isotherm 900° C. in dashed lines, obtained under final treatment temperatures of 900° C.), this oxynitride and this nitride of niobium having been prepared, for example, as indicated later on in Examples V and IV.

The treatment of niobium nitride according to the process of the invention at 900° C., naturally leads to niobium carbonitrides whose compositions, as a function of the nitrogen content of the gaseous mixture of carbonitridation, can be determined by means of the isotherm in dashed lines of FIGURE 4, in the case in which the other operating conditions of the process are identical to those of the treatment of the vanadium oxynitride envisaged above in connection with FIGURE 3.

The treatment under the same experimental conditions of the oxynitride $Nb_{0.73}N_{0.76}O_{0.23}$ has moreover revealed that the reaction products obtained are constituted by niobium oxycarbonitrides in the case of treatment temperatures of 800° C. and 900° C. (solid line isotherms 800° C. and 900° C.) and by carbonitrides at temperatures of the order of 1000° C., which corresponds to the complete elimination of the oxygen from the initial oxycarbonitride.

Table II given below reproduces the results obtained by treating the niobium oxynitride $Nb_{0.73}N_{0.76}O_{0.23}$ by a gaseous mixture of carbonitridation containing respectively 9 and 50% nitrogen, the temperature of the oxynitride having been, in each case, brought progressively to 1000° C. at the rate of 250°/h. and maintained at this temperature for 20 hours; it will be noticed that at the temperature of 1000° C. the niobium carbonitrides $NbC_cN_d$ that can be obtained are always poor in nitrogen since the ratio $$\frac{d}{c+d}$$

varies from 0.1 to 0.22.

der the conditions specified in Example VI. This tantalum oxynitride was then treated by a gaseous current constituted of hydrogen, methane and nitrogen, the proportion of nitrogen being variable in order to obtain the different points of the isotherm. The flow rates and temperatures adopted for this treatment are analogous to those indicated for the graphs of FIGURES 3 and 4.

(II) Mixed carbonitrides and oxycarbonitrides containing in particular elements of Group IVa or of Group VIa: The mixed carbonitrides and oxycarbonitrides in question can be defined in a general manner as the result of the substitution of part of the nitrogen by carbon in a solid solution of nitrides of two different transition metals:

$$M_{1-x}M'_xN_{1-y}C_y \text{ with } \begin{matrix}0<x<1\\0<y<1\end{matrix}$$

where $x$ represents the amount of substitution of the metal M by the metal M' and $y$ the amount of substitution of nitrogen by carbon, it being understood that, in certain cases, small proportions of oxygen (lower than 5% by weight) can be dissolved in a mixed metal carbonitride without a profound modification of the crystalline structure, such compounds then constituting oxycarbonitrides.

The principal compositions of binary solid solutions of general formula $M_xM'_{1-x}N_{1-y}C_y$ which can be obtained by carrying out the process according to the invention can be advantageously represented by means of the square diagram of FIGURE 6. In this diagram, the ordinate represents the amount $y$ of substitution of nitrogen by carbon, and the abscissa the amount of substitution $x$ of a metal M by the other metal M'.

The four corners of the square can then be attributed to the simple nitrides—MN: point $a$ ($x=0$, $y=0$, or M'N: point $b$ ($x=1$, $y=0$) and to the simple carbides—MC: point $c$ ($x=0$, $y=1$) or M'C: point $d$ ($x=1$, $y=1$).

By means of such a diagram, the following can be represented:

(1) Solid solutions of nitrides $M_{1-x}M'_xN$ by the straight line $ab$;

(2) Solid solutions of carbides $M_{1-x}M'_xC$ ($y=1$) by the straight line $cd$;

(3) The simple carbonitrides of the metal H: $MN_{1-y}C_y$ ($x=0$) by the straight line $ac$ or the carbonitrides of the metal M': $M'N_{1-y}C_y$ ($x=1$) by the straight line $bd$;

(4) Finally, the mixed carbonitrides of all the possible compositions are represented by the points inside this square. Thus, the carbonitride corresponding to the point $e$ of coordinates $x_e$ and $y_e$ corresponds to the following general formula:

$$M_{1-x_e}M'_{x_e}N_{1-y_e}C_{y_e}$$

By adopting this system of representation, it can be seen that the diagonals of the square $ad$ and $bc$ correspond to particular compositions of mixed carbonitrides which can be considered as solid solutions between the nitride

TABLE II

| Point of the isotherm | Flow $H_2$, l./h. | Flow $CH_4$, l./h. | Flow $N_2$, l./h. | Percent $N_2$ (by vol.) | Formula of the carbonitride | Value of the ratio $\frac{d}{c+d}$ |
|---|---|---|---|---|---|---|
| A | 20 | 0.2 | 2 | 9 | $NbN_{0.1}C_{0.91}$ | 0.1 |
| B | 20 | 0.2 | 20 | 50 | $NbN_{0.22}C_{0.87}$ | 0.22 |

The graph of FIGURE 5, relating to the conditions of formation of tantalum carbonitrides, comprises only the isotherm obtained at 1000° C., for at lower temperatures the carbidation becomes very slow.

This isotherm has been determined in a manner analogous to those represented on the graphs of FIGURES 3 and 4, by using as the starting product the tantalum oxynitride TaON. This oxynitride is obtained by subjecting the oxide $Ta_2O_5$ to nitridation by ammonia and hydrogen un- MN and the carbide M'C (diagonal $ad$) or the nitride M'N and the carbide MC (diagonal $bc$).

In this manner, FIGURES 7, 8, 9 and 10 represent the domains of possible variations, determined experimentally, of compositions of binary solutions of general formula $M_xM'_{1-x}N_{1-y}C_y$, in which M and M' represent the atoms of metals such as V, Ti, Nb, Cr, and $x$ and $y$ can vary between certain limits which will be indicated hereafter in connection with the study of each of FIGURES 7 to 10.

In a general manner, the process according to the invention substitutes part of the nitrogen of the mixed nitrides or oxynitrides by carbon while preserving the initial face centred cubic structure, in particular in the case of the preferred mixed nitrides and oxynitrides envisaged above. The simple nitrides or carbides then entering into the final composition of the mixed carbonitride lose their individuality and the crystalline structure is a cubic structure containing two metals, carbon and nitrogen in the case of carbonitrides, with oxygen in addition in the case of oxycarbonitrides. It should be noted that the niobium nitride which normally belongs to the crystalline system having hexagonal symmetry can crystallize in the face centred cubic system of the sodium chloride type, if it contains at least 1% (by weight) of oxygen in its crystalline structure.

It will be shown more particularly hereafter, in order to illustrate still further the invention, in relation with FIGURES 7, 8, 9 and 10, how the mixed carbonitrides and oxycarbonitrides can be obtained which are richest in carbon as a function of the corresponding mixed nitrides or oxynitrides, and accordingly, how the intervals of variation of the indices $x$ and $y$ can be established in the formulas of these carbonitrides or oxycarbonitrides.

(I) In order to define, for example, the domain in which the carbonitrides of titanium and vanadium can be obtained (FIGURE 7), the maximum temperature envisaged for this process is used, that it to say 1000° C. First the starting oxynitrides of the type $Ti_{1-x}V_xN_mO_n$ are prepared. These oxynitrides can be obtained in a manner known in itself, for example as described in the prior art: M. P. Roubin, J. M. Paris, R. A. Paris, French Patent No. 1,429,307 (November 1964).

Then, the gaseous current is regulated to a flow of 20 l./h. for the hydrogen and to a flow of 0.2 l./h. for the methane (1%), and the temperature of the oxynitride sample is increased at the rate of 250°/h. until the temperature of 1000° C. is reached, and the treated sample is maintained at this temperature in the gaseous current for 20 hours.

The X-ray diffraction spectrum of the final product characterizes a single phase crystallizing in the cubic system, and the analysis (whose results are indicated in Table III) shows that the final product is, according to the values of $x$, either a mixed carbonitride or a mixed oxycarbonitride.

TABLE III

| Point of the diagram (Fig. 7) | Flow $H_2$, l./h. | Flow $CH_4$, l./h. | $x$ | Formula of the carbonitride |
|---|---|---|---|---|
| A | 20 | 0.2 | 0.25 | $Ti_{0.75}V_{0.25}N_{0.57}C_{0.4}O_{0.1}$ |
| B | 20 | 0.2 | 0.50 | $Ti_{0.5}V_{0.5}N_{0.38}C_{0.61}$ |
| C | 20 | 0.2 | 0.73 | $Ti_{0.27}V_{0.73}N_{0.25}C_{0.74}$ |

The general formula of the carbonitrides of titanium and vanadium can thus be expressed in the following manner:

$$Ti_{1-x}V_xN_{1-y}C_y \text{ with } \begin{array}{l}0<x<1\\0<y<0.9\end{array}$$

(II) In order to define the domain in which the carbonitrides of titanium and niobium can be obtained at the temperature 1000° C. (FIGURE 8), the previous procedure can be followed, the starting oxynitrides being prepared in a known manner such as described in the previously cited prior art.

Table IV given below reproduces the results obtained by treating, at the temperature 1000° C., oxynitrides of the type: $Ti_{1-x}Nb_xN_pO_q$ in a gaseous current constituted of hydrogen and methane.

TABLE IV

| Point of the diagram (Fig. 8) | Flow $H_2$, l./h. | Flow $CH_4$, l./h. | $x$ | Formula of the carbonitride |
|---|---|---|---|---|
| A | 20 | 0.2 | 0.25 | $Ti_{0.75}Nb_{0.25}N_{0.83}C_{0.19}$ |
| B | 20 | 0.2 | 0.5 | $Ti_{0.5}Nb_{0.5}N_{0.53}C_{0.55}$ |
| C | 20 | 0.2 | 0.75 | $Ti_{0.25}Nb_{0.75}N_{0.19}C_{0.85}$ |

The general formula of these carbonitrides of titanium and niobium can thus be expressed in the following manner:

$$Ti_{1-x}Nb_xN_{1-y}C_y \text{ with } \begin{array}{l}0<x<1\\0<y<0.9\end{array}$$

Figure 9:
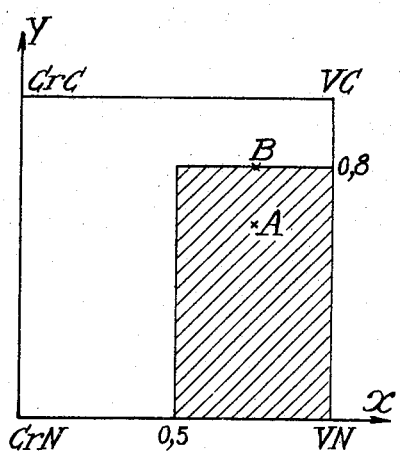
Figure 10:
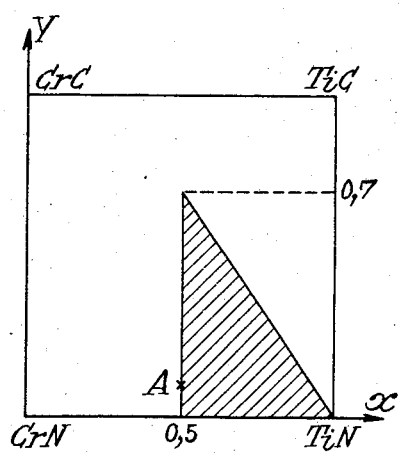

(III) The graphs of FIGURES 9 and 10 relate respectively to carbonitrides on the one hand of chrome-vanadium, and on the other hand of chrome-titanium, the intervals of variation of the indices $x$ and $y$ having been determined as above but using as starting product the mixed nitrides of the type $Cr_{1-x}V_xN$ and $Cr_{1-x}Ti_xN$.

The general formulas of these carbonitrides can thus be expressed as follows:

$$Cr_{1-x}V_xN_{1-y}C_y \text{ with } \begin{cases}0.5<x<1\\0<y<0.8\end{cases}$$

$$Cr_{1-x}Ti_xN_{1-y}C_y \text{ with } \begin{cases}0.5<x<1\\0<y<0.7\end{cases}$$

A few examples will now be given, by way of non-limiting example.

EXAMPLE I

Suppose it is desired to prepare a carbonitride of vanadium of composition $VN_{0.38}C_{0.62}$, that is to say rich in carbon and poor in nitrogen. The graph of FIGURE 3 indicates that such a compound, corresponding to the ratio $$\frac{b}{a+b}=0.38$$

can be obtained by effecting the carbonitridation of the vanadium oxynitride $VN_{0.96}O_{0.05}$ at 1000° C. On the isotherm (1000° C.) the point E of ordinate 0.38 and abscissa 43% $N_2$ fixes the percentage by volume of nitrogen that the gaseous carbonitridation mixture should contain. The vanadium oxynitride $VN_{0.96}O_{0.05}$ is obtained by subjecting some ammonium metavanadate to the action of a gaseous current formed of ammonia (10 l./h.) and hydrogen (10 l./h.), the temperature being raised at the rate of 250°/h. to 800° C. and being maintained at this temperature for 20 hours.

The oxynitride thus obtained is then subjected to carbonitridation by bringing it to 1000° C. at the rate of 250°/h. in a gaseous current comprising hydrogen (20 l./h.), methane (0.2 l./h.) and nitrogen (15 l./h.), that is to say containing 43% nitrogen corresponding to point E. After having been maintained at this temperature of 1000° C. for 20 hours in the atmosphere in question, it is noted that the product obtained is a crystallized cubic phase, whose analysis is the following: percent V=79.42; percent N=8.80; percent C=11.80. This product, which corresponds to the formula $VN_{0.40}C_{0.63}$ is very nearly the one that it was desired to obtain.

EXAMPLE II

Supposing it is desired to prepare a carbonitride of vanadium of a composition $VN_{0.57}C_{0.43}$, that is to say containing comparable proportions of nitrogen and carbon, it can be seen, on the graph of FIGURE 3, that such a compound, corresponding to the ratio $$\frac{b}{a+b}=0.57$$

can be obtained by carrying out the carbonitridation of vanadium oxynitride at 900° C. On the isotherm (900° C.), the point F of ordinate 0.57 has for its abscissa 16.5% $N_2$, the percentage of nitrogen which the gaseous carbonitridation mixture should contain.

The starting product, namely the vanadium oxynitride obtained as indicated in Example I, is subjected to carbonitridation by bringing it to 900° C. at the rate of 250°/h., in a gaseous current formed of hydrogen (15 l./h.), methane (0.2 l./h.) and nitrogen (3 l./h.), that is to say containing 16.5% nitrogen corresponding to the point F. After having been maintained at the temperature of 900° C. for 20 hours in the atmosphere in question, it is noted that the product obtained is a crystallized cubic phase whose analysis is the following: percent V=79.58; percent N=12.56; percent C=8.30. Thus this product is the carbonitride desired.

EXAMPLE III

Supposing it is desired to prepare a vanadium carbonitride of composition $VN_{0.92}C_{0.08}$, that is to say rich in nitrogen and poor in carbon, it can be seen, on the graph of FIGURE 3, that such a compound, corresponding to the ratio $$\frac{b}{a+b} = 0.92$$

can be obtained by carrying out the carbonitridation of the vanadium oxynitride at 800° C. On the isotherm (800° C.), the point G of ordinate 0.92 has for its abscissa 16.5% $N_2$, the percentage of nitrogen that the gaseous carbonitridation mixture should contain.

The starting product, namely the vanadium oxynitride obtained as indicated in Example I, is subjected to carbonitridation by bringing it to 800° C. at the rate of 250°/h. in a gaseous current comprising hydrogen (10 l./h.), methane (0.2 l./h.) and nitrogen (2 l./h.), that is to say containing 16.5% nitrogen corresponding to point G. After having maintained the product for 20 hours at this temperature of 800° C. in the atmosphere in question, it is noted that the product obtained is a crystallized cubic phase whose analysis is the following: percent V=77.94; percent N=20.58; percent C=1.54. This product is thus the carbonitride desired.

EXAMPLE IV

Supposing it is desired to prepare a niobium carbonitride of composition $NbN_{0.26}C_{0.74}$, that is to say rich in carbon and poor in nitrogen, it can be seen, on the graph of FIGURE 4, that such a compound, corresponding to the ratio $$\frac{d}{c+d} = 0.26$$

can be obtained by carrying out the carbonitridation of the niobium nitride NbN at 900° C. On the isotherm (900° C.), the point H of ordinate 0.26 has for abscissa 25% $N_2$, the percentage of nitrogen that the gaseous carbonitridation mixture should contain.

The starting product is the nitride NbN obtained by subjecting some fluoride $(NH_4)_2NbF_7$ to the action of a gaseous current comprising ammonia (5 l./h.) and hydrogen (5 l./h.), the temperature being raised at the rate at 250° C./h. up to 700° C. and maintained at this value for 10 hours.

The nitride thus obtained is then subjected to carbonitridation by bringing it to 900° C. at the rate of 250° C./h. in a gaseous current formed of hydrogen (15 l./h.), methane (0.2 l./h.) and nitrogen (5 l./h.), that is to say containing 25% nitrogen corresponding to point H of the corresponding isotherm. After having been maintained at this temperature of 900° C. for 20 hours in the atmosphere in question, it is noted that the product obtained is a crystallized cubic phase whose analysis is the following: percent Nb=87.38; percent N=3.60; percent C=8.62. The product, which corresponds to the formula $NbN_{0.27}C_{0.76}$ is very nearly the one that it was desired to obtain.

EXAMPLE V

Supposing it is desired to prepare an oxycarbonitride of niobium of composition $NbN_{0.47}C_{0.53}O_{0.1}$, that is to say containing comparable proportions of nitrogen and carbon, it can be seen, on the graph of FIGURE 4, that such a compound, corresponding to the ratio $$\frac{f}{e+f} = 0.47$$

can be obtained by carrying out the carbonitridation of the niobium oxynitride $Nb_{0.73}N_{0.76}O_{0.23}$ at a temperature of 900° C. On the isotherm 900° C., the point I of ordinate 0.57 has for abscissa 16.5% $N_2$, the percentage of nitrogen that the gaseous carbonitridation mixture should contain.

The niobium oxynitride $Nb_{0.73}N_{0.76}O_{0.23}$ is obtained by subjecting the hydroxide $Nb_2O_5 \cdot nH_2O$ to the action of a gaseous current comprising ammonia (10 l./h.) and hydrogen (10 l./h.), the temperature being raised at the rate of 250°/h. to 800° C. and maintained at this temperature for 20 hours.

The oxynitride thus obtained is then subjected to carbonitridation by bringing it to 900° C. at the rate of 250°/h. in a gaseous current comprising hydrogen (20 l./h.), methane (0.2 l./h.) and nitrogen (4 l./h.), that is to say containing 16.5% nitrogen, corresponding to point I. After 20 hours at this temperature of 900° C. in the atmosphere in question, it is noted that the product obtained is a crystallized cubic phase whose analysis is the following: percent Nb=86.40; percent N=6.24; percent C=5.92; percent O=1.44. This product is thus the oxycarbonitride desired.

EXAMPLE VI

Supposing it is desired to prepare a tantalum carbonitride of composition $TaN_{0.30}C_{0.70}$, that is to say rich in nitrogen, it can be seen that the graph of FIGURE 5 indicates that such a compound, corresponding to the ratio $$\frac{i}{i+h} = 0.30$$

can be obtained by carrying out the carbonitridation of the tantalum oxynitride at 1000° C.

On the isotherm 1000° C., the point J of ordinate 0.30 has for abscissa 50% $N_2$, the percentage of nitrogen that the gaseous carbonitridation mixture should contain. The starting product is the tantalum oxynitride TaON obtained by subjecting the oxide $Ta_2O_5$ to the action of a gaseous current comprising ammonia (10 l./h.), the temperature being raised at the rate of 250°/h. to 800° C. and maintained at this value for 20 hours.

The oxynitride thus obtained is then subjected to carbonitridation by bringing it to 1000° C. at the rate of 250°/h. in a gaseous current comprising hydrogen (20 l./h.), methane (0.2 l./h.) and nitrogen (20 l./h.), that is to say containing 50% nitrogen corresponding to point J. After 20 hours at this temperature of 1000° C. in the atmosphere in question, it is noted that the product is a crystallized cubic phase whose analysis is the following: percent Ta=92.66; percent N=2.66. percent C=5.17. This product, which corresponds to the formula $$TaN_{0.37}C_{0.84}$$

is very nearly the one that it was desired to obtain.

EXAMPLE VII

Figure 7:
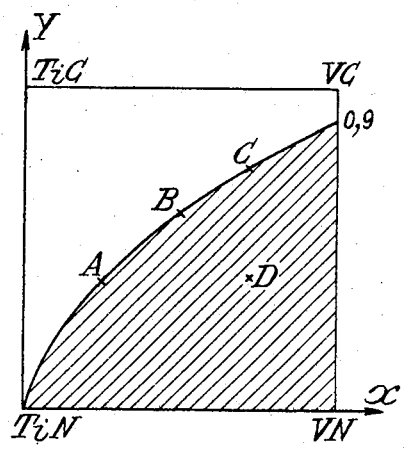
FIGURES 7, 8, 9 and 10 represent graphs permitting the determination of the limit formulas of certain of the mixed carbonitrides which can be obtained according to the process of the present invention.

Supposing it is desired to prepare a mixed carbonitride of vanadium and titanium base of composition corresponding to point D which is located inside the crosshatched domain of FIGURE 7, and which has, for example, in its composition, a value of $x$ equal to that of the mixed carbonitride represented by point C, first of all the starting mixed oxynitride is prepared. This compound is obtained by subjecting a coprecipitate of hydrated oxides in appropriate proportions to the action of a gaseous current comprising ammonia (10 l./h.) and hydrogen (10 l./h.), the temperature being raised at the rate of 250°/h. to 800° C. and maintained at this temperature for 20 hours.

The mixed oxynitride obtained is then subjected to carbonitridation by bringing it to 1000° C. at the rate of 250°/h. in a gaseous current comprising hydrogen (20 l./h.), methane (0.2 l./h.) and nitrogen (10 l./h.), that is to say containing 33% nitrogen. After 20 hours at this temperature of 1000° C. in the atmosphere in question, it is noted that the product obtained is a phase crystallizing in the face centred cubic system whose analysis is the following: percent V=57.5; percent Ti=19.9; percent N=14.8; percent C=7.7.

This product (point D), which corresponds to the formula: $Ti_{0.27}V_{0.73}N_{0.68}C_{0.41}$, is a carbonitride which is less rich in carbon and thus more rich in nitrogen than that (point C) obtained by the process according to the invention, but without nitrogen in the gaseous carbonitridation mixture ($Ti_{0.27}V_{0.73}N_{0.25}C_{0.74}$).

EXAMPLE VIII

Figure 8:
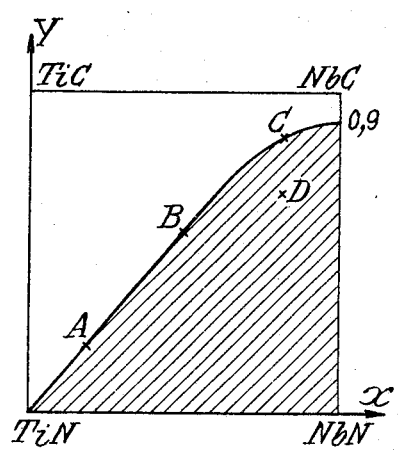

Supposing it is desired to prepare a mixed carbonitride of niobium and titanium base of composition corresponding to a point D which is located inside the cross-hatched domain of FIGURE 8, and which has, for example, in its composition, a value of x equal to that of the mixed carbonitride represented by point C, first of all the starting mixed oxynitride is prepared. This compound is obtained by subjecting a coprecipitate of hydrated oxides in appropriate proportions to the action of a gaseous current comprising ammonia (10 l./h.) and hydrogen (10 l./h.), the temperature being increased at the rate of 250°/h. to 800° C., this temperature being maintained for 20 hours. The mixed oxynitride thus obtained is then subjected to carbonitridation by bringing it to 1000° C. at the rate of 250°/h. in a gaseous current comprising hydrogen (20 l./h.), methane (0.2 l./h.) and nitrogen (10 l./h.), that is to say containing 33% nitrogen. After 20 hours at this temperature of 1000° C. in the atmosphere in question, it is noted that the product obtained is a phase crystallizing in the face centred cubic system whose analysis is the following: percent Ti=12.1; percent Nb=72.9; percent N=6.0; percent C=8.7.

This product, which corresponds to the formula (point C): $Ti_{0.25}Nb_{0.75}N_{0.41}C_{0.69}$, is a carbonitride less rich in carbon and more rich in nitrogen than the one obtained under the same conditions, but without nitrogen in the gaseous mixture (point C): $Ti_{0.25}Nb_{0.75}N_{0.19}C_{0.85}$.

EXAMPLE IX

Supposing it is desired to prepare a mixed carbonitride of chromium and vanadium base of a composition corresponding to a point A which is located inside the cross-hatched doman of FIGURE 9, first of all the starting mixed nitride is prepared. This compound is obtained by subjecting a mixed oxalic complex or a coprecipitate of hydrated oxides in appropriate proportions to the action of a gaseous current comprising ammonia (10 l./h.) and hydrogen (10 l./h.), the temperature being raised at the rate of 250°/h. to a temperature comprising between 800 and 1000° C., the chosen temperature being maintained for 20 hours. The mixed nitride thus obtained, which is, for example, of the type $Cr_{0.25}V_{0.75}N$, is then subjected to carbonitridation by bringing it to 900° C. at the rate of 250°/h. in a gaseous current comprising hydrogen (15 l./h.), methane (0.2 l./h.) and nitrogen (0.7 l./h.), that is to say containing 4.4% nitrogen. After 20 hours at this temperature of 900° C. in the atmosphere in question, it is noted that the product obtained is a phase crystallizing in the face centred cubic system whose analysis is the following: percent Cr=20.6; percent V=60.6; percent N=7.4; percent C=11.4.

This product corresponds to the formula:

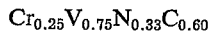

$Cr_{0.25}V_{0.75}N_{0.33}C_{0.60}$

By operating under the same conditions, but without nitrogen in the gaseous mixture, the mixed carbonitride corresponding to point B of FIGURE 9 is obtained.

EXAMPLE X

Supposing it is desired to prepare a mixed carbonitride of chromium and titanium base, of composition corresponding to a point A represented in FIGURE 10, first of all the starting mixed nitride is prepared. This compound is obtained by subjecting a coprecipitate of hydrated oxides in suitable proportions to the action of a gaseous current comprising ammonia (10 l./h.) and hydrogen (10 l./h.), the temperature being raised at the rate of 250°/h. to 1000° C. and this temperature being maintained for 20 hours.

The mixed nitride thus obtained, which is for example of the type $Cr_{0.5}Ti_{0.5}N$ is then subjected to carbonitridation by bringing it to 1000° C. at the rate of 250°/h. in a gaseous current comprising hydrogen (20 l./h.), methane (0.2 l./h.) and nitrogen (0.6 l./h.), that is to say containing 3.8% nitrogen. After 20 hours at this temperature of 1000° C. in the atmosphere in question, it is noted that the product obtained is a cubic phase whose analysis is the following: percent Cr=41.7; percent Ti=38.4; percent N=18.4; percent C=1.8.

This product coresponds to the formula:

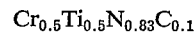

$Cr_{0.5}Ti_{0.5}N_{0.83}C_{0.1}$

EXAMPLE XI

Supposing it is desired to prepare a mixed carbonitride of chromium, titanium and vanadium base, first of all the starting mixed nitride is prepared. This compound is obtained by subjecting a coprecipitate of hydrated oxides, in suitable proportions, to the action of a gaseous current comprising ammonia (10 l./h.) and hydrogen (10 l./h.), the temperature being raised at the rate of 250°/h. to 1000° C. where it is maintained for 20 hours.

The mixed nitride thus obtained, which is for example of the type $Cr_{0.33}V_{0.33}Ti_{0.33}N$, is then subjected to carbidation by bringing it to 1000° C. at the rate of 250°/h. in a gaseous current comprising hydrogen (20 l./h.) and methane (0.2 l./h.). After 20 hours at this temperature of 1000° C. in the atmosphere in question, it is noted that the product obtained is a cubic phase whose analysis is the following: percent Cr=26.7; percent V=26.1; percent Ti=24.6; percent N=6.8; percent C=15.4.

This product corresponds to the formula:

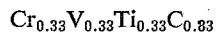

$Cr_{0.33}V_{0.33}Ti_{0.33}C_{0.83}$

The simple and mixed metal carbonitrides and oxycarbonitrides obtained by the process according to the present invention have a remarkable industrial interest by the variety of the possible applications. Only the most important will be cited here.

Like metal carbides, and by reason of the similarities of structure, these are refractory materials on the one hand, and abrasives on the other hand, and accordingly are usable as such. However, it is important to emphasize that their most marked interest resides in their use as additives for conferring special properties on steel and other metal alloys (high-speed cutting steel for example).

The advantage that the mixed carbonitrides and mixed oxycarbonitrides obtained according to the process of the invention, that is to say at low temperature, have with respect to the same materials obtained according to conventional processes of the prior art, comprising heating to high temperatures, is that these materials (prepared according to the present invention) are in a powder state which is more easily grindable due to their finer crystalline grain. It is thus easier to obtain fine granulation for these powders, and this is a considerable advantage when it is wished to disperse them in an alloy in the melted state, or, as is most frequently the case, when sintering techniques are to be used, that is to say the techniques of the metallurgy of powders. For the same reasons, the powders of mixed carbonitrides and mixed oxycarbonitrides prepared according to the invention are advantageously usable for manufacturing composite materials of the "cermet" type by associating them by sintering with appropriate ceramics.

Another important domain of application of these mixed carbonitrides and oxycarbonitrides results from their electric and magnetic properties. In particular, certain of them have semi-conductor properties which, allied with the refractory properties and the resistance to chemical agents, make these materials very promising.

The present invention provides a process having numerous advantages which are apparent from the foregoing, and among which can be cited in particular the possibility of working at a temperature much lower than in the known processes, which permits numerous new products to be obtained (which should be considered independently of their processes of prearation) and the possibility of obtaining carbonitrides and oxycarbonitrides, even known, which nevertheless have, in a general manner, new characteristics, in particular a very divided crystalline form rendering them more particularly adapted to the various applications mentioned above.

The invention could possibly be extended to the preparation of carbonitrides and oxycarbonitrides containing several elements of Group V$a$ of the Periodic Table.

Although the present invention has been described with particular reference to specific examples, it is clear that the invention is not limited thereto, and that various modifications to the process are possible without departing from the spirit or the scope of this invention.

What we claim is:

1. A process for preparing simple and mixed carbonitrides and oxycarbonitrides containing those of the transition metals from Groups IV$a$, V$a$ and VI$a$ of the Periodic Table that form simple and mixed nitrides and oxynitrides capable of losing nitrogen when they are heated to a temperature higher than 800° C., which comprises heating a starting compound selected from the group consisting of said nitrides and oxynitrides to a temperature ranging from about 800° C. to about 1000° C. in an atmosphere containing (a) a nitrogen containing gas, (b) a hydrocarbon, and (c) hydrogen in an amount sufficient to prevent cracking of said hydrocarbon at said temperature.

2. A process according to claim 1 in which said nitrogen containing gas is nitrogen itself.

3. A process according to claim 1 in which said nitrogen containing gas is ammonia.

4. A process according to claim 1 in which said hydrocarbon is methane.

5. A process according to claim 1 for preparing simple carbonitrides and oxycarbonitrides of metals of the Group V$a$ of the Periodic Table, in which said nitrides and oxynitrides have a formula selected from the group consisting of:

$VN$ $NbN$ $TaON$ $VN_mN_n$ with $\begin{cases} 0.9 < m < 1 \\ 0.05 < n < 0.1 \end{cases}$ $NbN_mO_n$ with $\begin{cases} 1 < m < 1.2 \\ 0.1 < n < 0.3 \end{cases}$ 6. A process according to claim 1 for preparing mixed carbonitrides and oxycarbonitrides containing an element of Group IV$a$ of the Periodic Table, in which said starting compound is selected from the group consisting of mixed nitrides and oxynitrides, which form solid solutions, of said Group IV$a$ element and an auxiliary element selected from the group consisting of Groups V$a$ and VI$a$ of the Periodic Table.

7. A process according to claim 1 for preparing mixed carbonitrides and oxycarbonitrides containing an element of Group VI$a$ of the Periodic Table, in which said starting compound is selected from the group consisting of mixed nitrides and oxynitrides, which form solid solutions, of said group VI$a$ element and an auxiliary element selected from the group consisting of Groups V$a$ and IV$a$ of the Periodic Table.

8. A process according to claim 6 in which said mixed nitrides and oxynitrides have a formula selected from the group consisting of:

$Cr_xTi_{1-x}N$ with $0 < x < 1$ $Ti_xV_{1-x}N_mO_n$ with $\begin{cases} 0 < x < 1 \\ 0.8 < m < 0.95 \\ 0.1 < n < 0.25 \end{cases}$ and $Ti_xNb_{1-x}N_pO_q$ with $\begin{cases} 0 < x < 1 \\ 1 < p < 1.05 \\ 0.1 < q < 0.2 \end{cases}$ 9. A process according to claim 7 in which said mixed nitrides have a formula selected from the group consisting of:

$Cr_xV_{1-x}N$ with $0 < x < 1$ and $Cr_xTi_{1-x}N$ with $0 < x < 1$

References Cited

UNITED STATES PATENTS 3,011,982   12/1961   Maduk et al. _____ 106—55

OSCAR R. VERTIZ, Primary Examiner

HOKE S. MILLER, Assistant Examiner

U.S. Cl. X.R.

106—55; 23—203